United States Patent
Nishisaka et al.

(10) Patent No.: US 9,275,804 B2
(45) Date of Patent: *Mar. 1, 2016

(54) CERAMIC ELECTRONIC COMPONENT AND METHOD FOR PRODUCING THE SAME

(71) Applicant: Murata Manufacturing Co., Ltd., Nagaokakyo-shi, Kyoto-fu (JP)

(72) Inventors: Yasuhiro Nishisaka, Nagaokakyo (JP); Yukio Sanada, Nagaokakyo (JP); Tetsuya Kisumi, Nagaokakyo (JP); Toshiki Nagamoto, Nagaokakyo (JP); Masato Kimura, Nagaokakyo (JP); Seiji Koga, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 26 days.

This patent is subject to a terminal disclaimer.

(21) Appl. No.: 13/755,232

(22) Filed: Jan. 31, 2013

(65) Prior Publication Data

US 2013/0201601 A1 Aug. 8, 2013

(30) Foreign Application Priority Data

Feb. 3, 2012 (JP) ................. 2012-022321
Feb. 3, 2012 (JP) ................. 2012-022323
Feb. 3, 2012 (JP) ................. 2012-022324
Dec. 27, 2012 (JP) ................. 2012-284454

(51) Int. Cl.
*H01G 4/30* (2006.01)
*H01G 4/232* (2006.01)
*H01G 13/00* (2013.01)

(52) U.S. Cl.
CPC ........... *H01G 13/006* (2013.01); *H01G 4/2325* (2013.01); *H01G 4/306* (2013.01); *H01G 4/30* (2013.01)

(58) Field of Classification Search
CPC ....... H01G 4/2325; H01G 4/232; H01G 4/30; H01L 41/0472
USPC .................... 361/306.3, 321.2, 305
See application file for complete search history.

(56) References Cited

U.S. PATENT DOCUMENTS 5,712,758 A * 1/1998 Amano et al. ............. 361/321.2
5,818,686 A  10/1998 Mizuno et al.
(Continued)

FOREIGN PATENT DOCUMENTS

EP     777242 A2 *  6/1997
JP    04023308 A *  1/1992
(Continued)

OTHER PUBLICATIONS

Nishisaka et al, "Ceramic Electronic Component", U.S. Appl. No. 13/755,197, filed Jan. 31, 2013.
(Continued)

*Primary Examiner* — David M Sinclair
(74) *Attorney, Agent, or Firm* — Keating & Bennett, LLP

(57) ABSTRACT

A ceramic electronic component includes a ceramic body, a glass coating layer, and an electrode terminal. The ceramic body includes a plurality of internal electrodes whose ends are exposed on the surface of the ceramic body. The glass coating layer covers a portion of the ceramic body on which the internal electrodes are exposed. The electrode terminal is provided directly on the glass coating layer. The electrode terminal includes a plating film. The glass coating layer is made of a glass medium in which metal powder particles are dispersed. The metal powder particles define conduction paths that electrically connect the internal electrodes with the electrode terminal.

11 Claims, 12 Drawing Sheets

(56) References Cited

U.S. PATENT DOCUMENTS

| | | |
|---|---|---|
| 2003/0231457 A1 | 12/2003 | Ritter et al. |
| 2004/0022009 A1 | 2/2004 | Galvagni et al. |
| 2004/0090732 A1 | 5/2004 | Ritter et al. |
| 2004/0197973 A1 | 10/2004 | Ritter et al. |
| 2004/0218344 A1 | 11/2004 | Ritter et al. |
| 2004/0218373 A1 | 11/2004 | Ritter et al. |
| 2004/0257748 A1 | 12/2004 | Ritter et al. |
| 2004/0264105 A1 | 12/2004 | Galvagni et al. |
| 2005/0046536 A1 | 3/2005 | Ritter et al. |
| 2005/0146837 A1 | 7/2005 | Ritter et al. |
| 2006/0137488 A1* | 6/2006 | Sakaue et al. ............ 75/255 |
| 2007/0014075 A1 | 1/2007 | Ritter et al. |
| 2007/0133147 A1 | 6/2007 | Ritter et al. |
| 2009/0190285 A1 | 7/2009 | Kusano et al. |
| 2012/0007709 A1* | 1/2012 | Taniguchi et al. ......... 336/200 |

FOREIGN PATENT DOCUMENTS

| | | | |
|---|---|---|---|
| JP | 08-097075 A | | 4/1996 |
| JP | 09007879 A | * | 1/1997 |
| JP | 09-102854 A | | 4/1997 |
| JP | 10-050550 A | | 2/1998 |
| JP | 11243029 A | * | 9/1999 |
| JP | 2000-077258 A | | 3/2000 |
| JP | 2002134351 A | * | 5/2002 |
| JP | 2002-203737 A | | 7/2002 |
| JP | 2004-327983 A | | 11/2004 |
| JP | 2005-228610 A | | 8/2005 |
| JP | 2005209415 A | * | 8/2005 |
| JP | 2007036003 A | * | 2/2007 |
| JP | 2011-49351 A | | 3/2011 |
| KR | 10-2009-0042850 A | | 4/2009 |
| WO | 2004/093137 A2 | | 10/2004 |

OTHER PUBLICATIONS

Nishisaka et al, "Ceramic Electronic Component", U.S. Appl. No. 13/755,224, filed Jan. 31, 2013.

* cited by examiner

CERAMIC ELECTRONIC COMPONENT AND METHOD FOR PRODUCING THE SAME

BACKGROUND OF THE INVENTION

1. Field of the Invention

The present invention relates to a ceramic electronic component and a method for producing the same.

2. Description of the Related Art

Ceramic electronic components, typified by ceramic capacitors, are widely used in electronic devices, such as a cellular phone or a portable audio player. A ceramic electronic component generally includes a ceramic body; internal electrodes whose ends are exposed on the surface of the ceramic body; and external electrodes disposed to cover the surface regions of the ceramic body on which the internal electrodes are exposed. Examples of the external electrode include one obtained by applying and baking an electrically conductive paste on the ceramic body to form a sintered metal film and then plating the sintered metal film, as described in JP-A-2002-203737, and one formed only of a plating film, as described in JP-A-2004-327983.

However, because the electrically conductive paste used in forming the sintered metal film has high viscosity, the thickness of the resultant sintered metal film becomes large. For example, JP-A-2002-203737 states that the thickness of first and second electrode layers (sintered metal films) reaches approximately 50 μm to 90 μm.

Furthermore, if the external electrode is formed of a sintered metal film, the baking temperature at which the electrically conductive paste is baked reaches a high temperature. Therefore, a ceramic component in the ceramic body and a glass component in the electrically conductive paste may diffuse into each other to form a reaction layer at the interface between the ceramic body and the sintered metal film. In this case, a plating solution may enter the ceramic body through the site where the reaction layer is formed, which may cause a problem of a decrease in mechanical strength of the ceramic body and a problem of deterioration in reliability of moisture resistance thereof. In addition, the high baking temperature causes the precipitation of the glass component on the surface of the sintered metal film, i.e., glass floating, which presents another problem of difficulty in forming a plating film on the surface of the sintered metal film.

To cope with this, a method of making an external electrode only of a plating film is proposed as in JPA-2004-327983. When an external electrode is made only of a plating film, the external electrode can be formed thinner than that formed by baking an electrically conductive paste, for example.

In addition, because the plating solution contains no glass component, no reaction layer is formed at the interface between the ceramic body and the plating film. Therefore, problems of a decrease in mechanical strength and deterioration in reliability of moisture resistance due to the formation of the reaction layer are less likely to occur. No glass floating occurs, so that the problem of difficulty in forming a plating film can be eliminated.

However, in order to form the external electrode only of a plating film, it is necessary to immerse the ceramic body directly into a plating solution. This presents a problem of entrance of the plating solution into the ceramic body through exposed portions of the internal electrodes. Thus, the resultant ceramic electronic component may have decreased the moisture resistance.

Furthermore, when the external electrode is formed only of a plating film, the plating film is not chemically bound but only physically bound to the ceramic body, so that the adhesion between the plating film and the ceramic body will be poor. As a result, when the ceramic electronic component is in use, moisture or the like is likely to enter the ceramic body from between the plating film and the ceramic body. Also in this view, the resultant ceramic electronic component may decrease the moisture resistance.

SUMMARY OF THE INVENTION

Preferred embodiments of the present invention provide a ceramic electronic component having superior moisture resistance while maintaining a small thickness of the external electrode.

A ceramic electronic component according to a preferred embodiment of the present invention includes a ceramic body, a glass coating layer, and an electrode terminal provided directly on the glass coating layer. The ceramic body includes a plurality of internal electrodes whose ends are exposed on a surface of the ceramic body. The glass coating layer covers a portion of the ceramic body on which the plurality of internal electrodes are exposed. The electrode terminal is provided directly on the glass coating layer and is defined only by a plating film. The glass coating layer is made of a glass medium in which metal powder particles are dispersed. The metal powder particles define conduction paths electrically connecting the plurality of internal electrodes with the electrode terminal.

In a particular aspect of the ceramic electronic component according to a preferred embodiment of the present invention, the content of glass in the glass coating layer preferably is about 30.2% to about 47.1% by volume.

In another particular aspect of the ceramic electronic component according to a preferred embodiment of the present invention, the metal powder particles preferably have an elongated shape as viewed in cross section along a thickness direction of the glass coating layer.

In still another particular aspect of the ceramic electronic component according to a preferred embodiment of the present invention, the metal powder particles preferably are in rod form or flake form.

In still another particular aspect of the ceramic electronic component according to a preferred embodiment of the present invention, the metal powder particles preferably have an aspect ratio of about 3.6 or more.

In still another particular aspect of the ceramic electronic component according to a preferred embodiment of the present invention, at least one of the conduction paths is preferably arranged so that a plurality of the metal powder particles are contiguous with one another across the thickness of the glass coating layer.

In still another particular aspect of the ceramic electronic component according to a preferred embodiment of the present invention, the metal powder particles preferably contain a major component different from a major component of the internal electrodes.

In still another particular aspect of the ceramic electronic component according to a preferred embodiment of the present invention, the metal powder particles preferably include a core made of Cu.

In still another particular aspect of the ceramic electronic component according to a preferred embodiment of the present invention, the glass coating layer preferably has a thickness of about 1 μm to about 10 μm.

In still another particular aspect of the ceramic electronic component according to a preferred embodiment of the present invention, at least one of the conduction paths preferably is non-linear as viewed in cross section along the thickness direction of the glass coating layer.

In still another particular aspect of the ceramic electronic component according to a preferred embodiment of the present invention, at least one of the conduction paths preferably includes a plurality of relatively narrow portions and a plurality of relatively thick portions.

In still another particular aspect of the ceramic electronic component according to a preferred embodiment of the present invention, a portion of the plating film in contact with the glass coating layer preferably includes a Cu plating film or a Ni plating film.

In a method for producing a ceramic electronic component according to another preferred embodiment of the present invention, a glass paste containing about 35% to about 50% by volume glass powder particles per total solids and metal powder particles is preferably applied on a portion of a ceramic body on which a plurality of internal electrodes are exposed. The glass paste is thermally treated at about 600° C. to about 800° C. to form a glass coating layer on the portion of the ceramic body on which the plurality of internal electrodes are exposed. An electrode terminal made of a plating film is formed directly on the glass coating layer.

In various preferred embodiments of the present invention, a ceramic electronic component can be provided which has superior moisture resistance while maintaining a small thickness of the electrode terminal (external electrode).

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
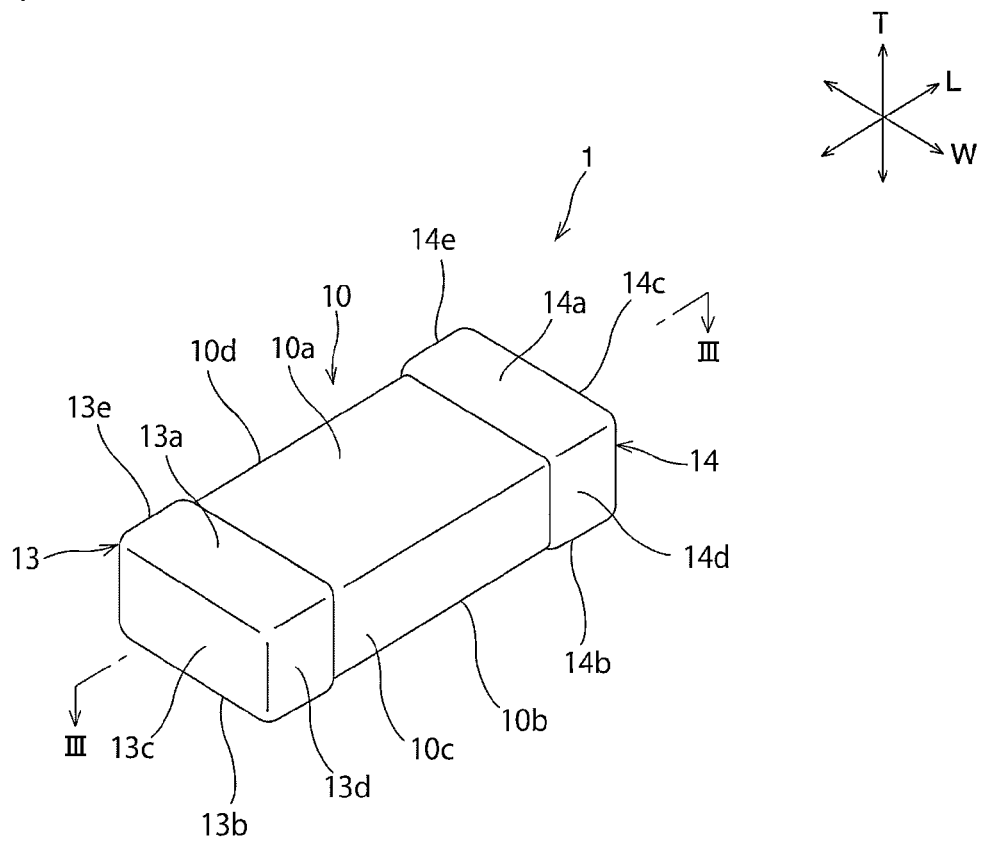
FIG. 1 is a schematic perspective view of a ceramic electronic component according to a first preferred embodiment of the present invention.

Hereinafter, preferred embodiments of the present invention will be described. However, the following preferred embodiments are merely illustrative. The present invention is not intended to be limited to the following preferred embodiments.

Throughout the drawings to which the preferred embodiments and the like refer, elements having substantially the same functions will be referred to by the same reference signs. The drawings to which the preferred embodiments and the like refer are schematically illustrated and, therefore, the dimensional ratios and the like of elements illustrated in the drawings may be different from those of the actual elements. Different drawings may have different dimensional ratios and the like of the elements. Dimensional ratios and the like of specific objects should be determined in consideration of the following descriptions.

Figure 2:
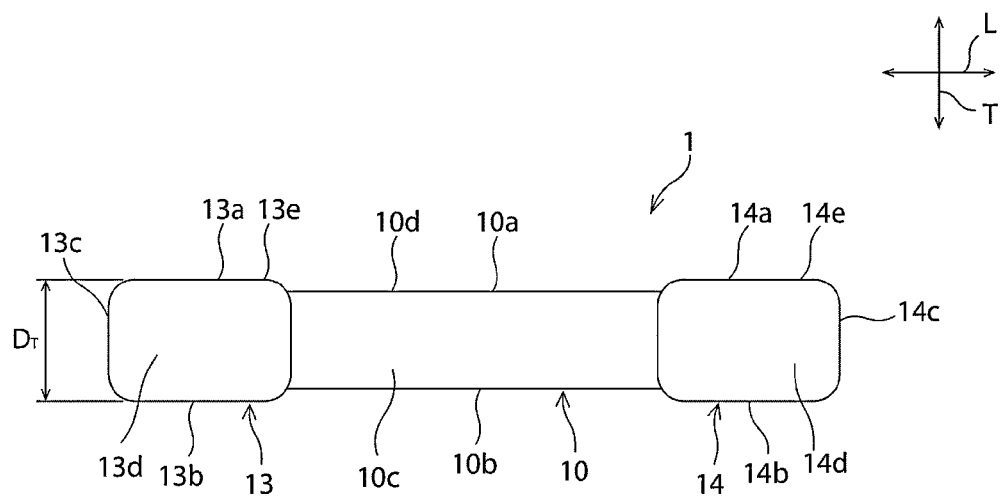
FIG. 2 is a schematic side view of the ceramic electronic component according to the first preferred embodiment of the present invention.
Figure 3:
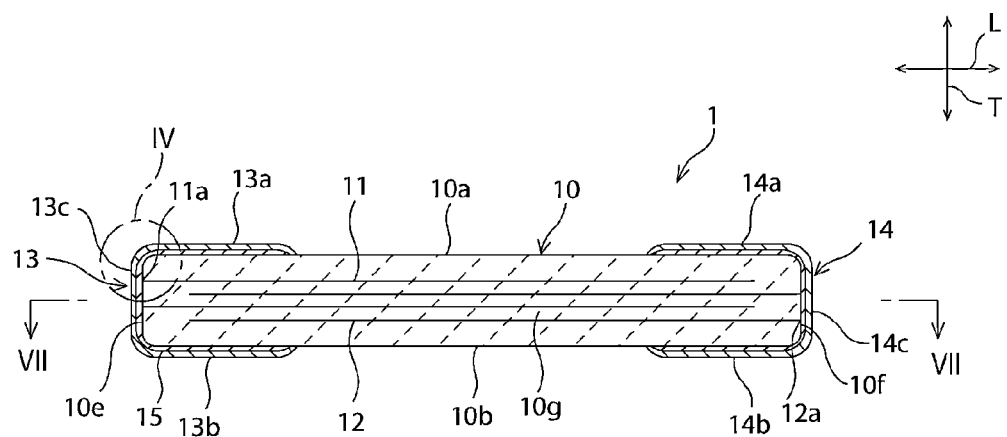
FIG. 3 is a schematic cross-sectional view taken along the line III-III in FIG. 1.
Figure 4:
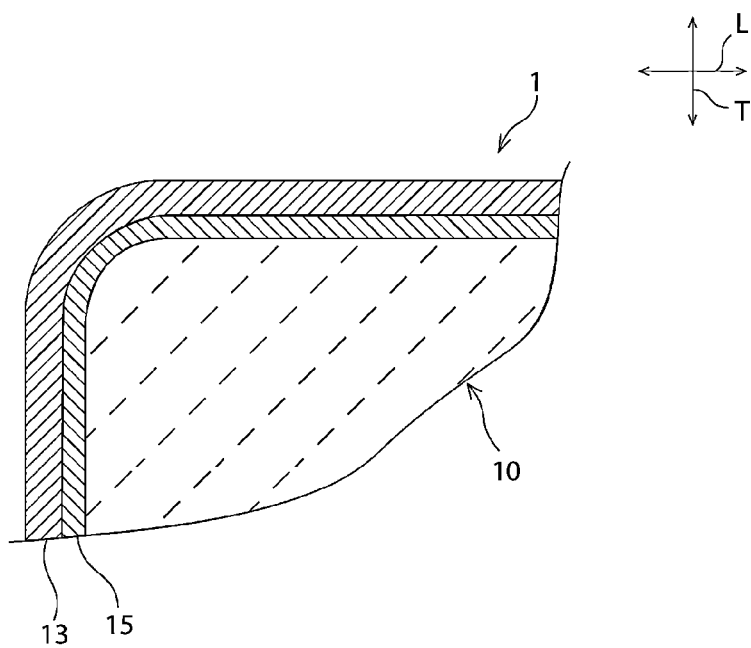
FIG. 4 is a schematic enlarged cross-sectional view of a portion enclosed by the line IV in FIG. 3.
Figure 5:
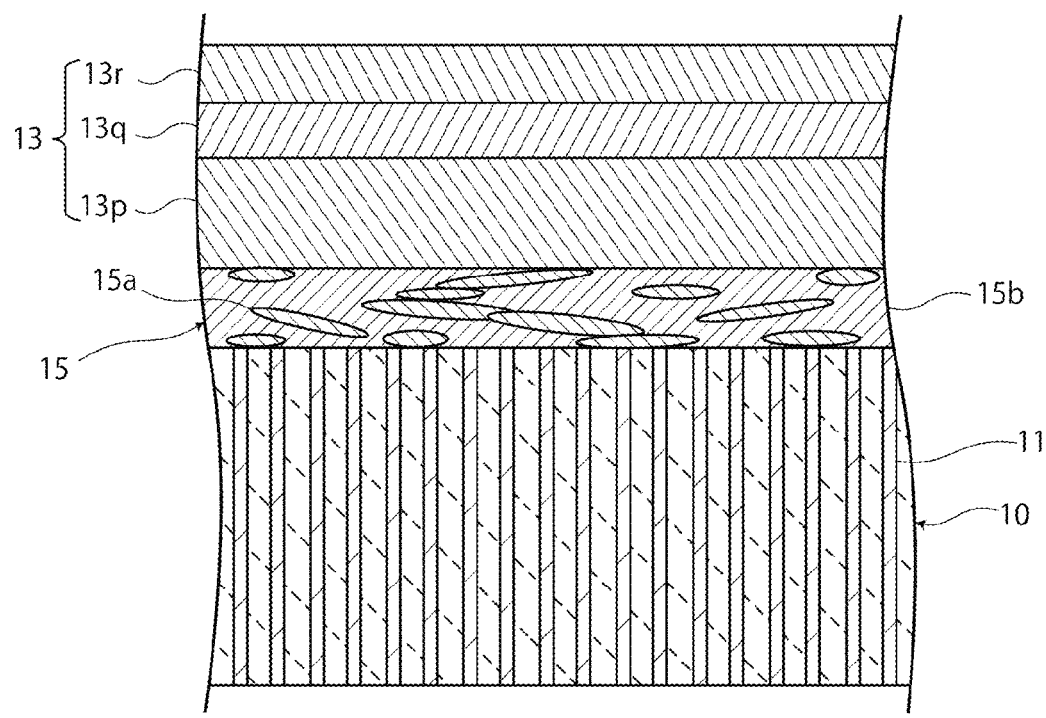
FIG. 5 is a schematic cross-sectional view of a glass coating layer and a first electrode terminal of the ceramic electronic component produced in the first preferred embodiment of the present invention.
Figure 6:
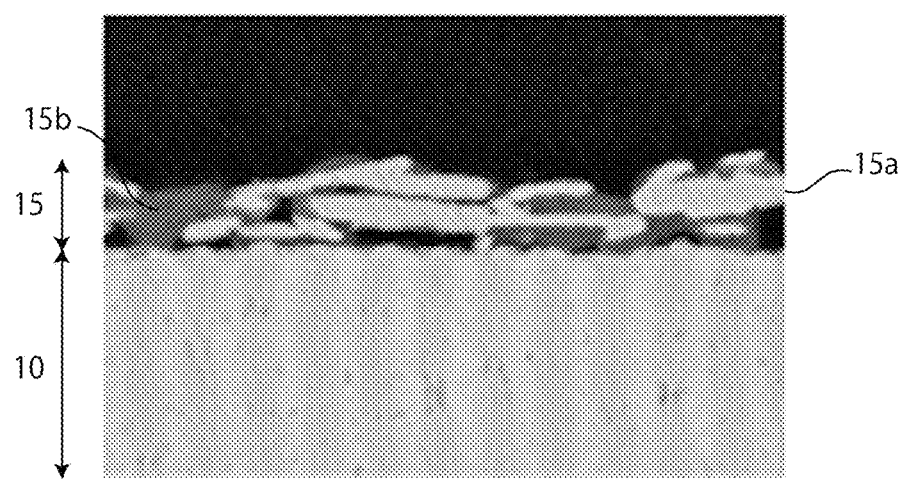
FIG. 6 is a scanning electron microscopic photograph of a cross section of the glass coating layer in an end surface of the ceramic electronic component produced in the first preferred embodiment of the present invention.
Figure 7:
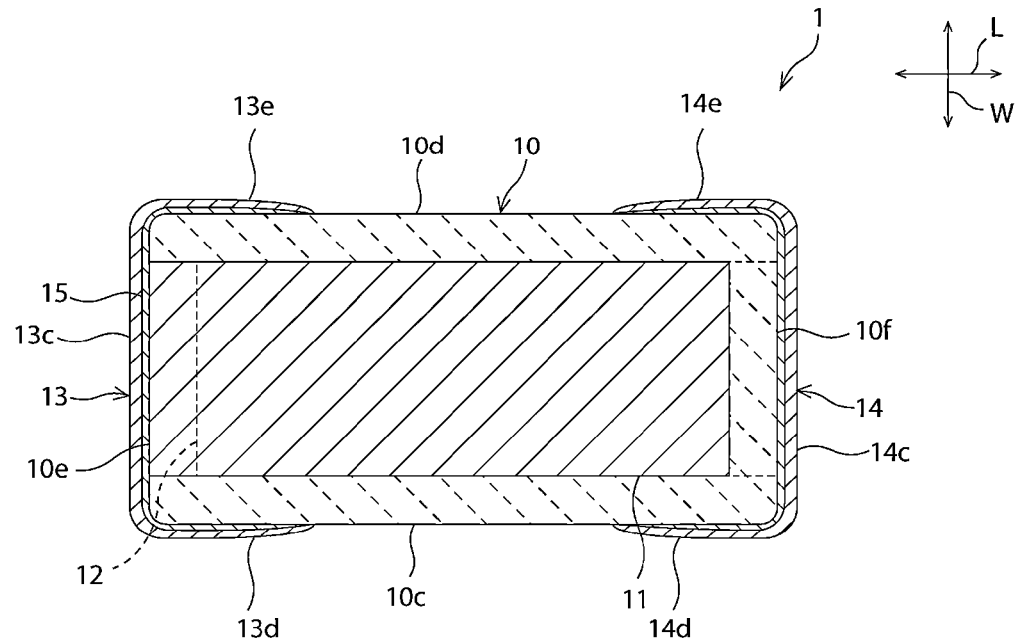
FIG. 7 is a schematic cross-sectional view taken along the line VII-VII in FIG. 3.

FIG. 1 is a schematic perspective view of a ceramic electronic component according to a first preferred embodiment of the present. FIG. 2 is a schematic side view of the ceramic electronic component according to the first preferred embodiment. FIG. 3 is a schematic cross-sectional view taken along the line III-III in FIG. 1. FIG. 4 is a schematic enlarged cross-sectional view of a portion enclosed by the line IV in FIG. 3. FIG. 5 is a schematic cross-sectional view of a glass coating layer and a first electrode terminal of the ceramic electronic component produced in this preferred embodiment. FIG. 6 is a scanning electron microscopic (SEM) photograph of a cross section of the interface between the glass coating layer and a first electrode terminal of the ceramic electronic component produced in this preferred embodiment. Note that FIG. 6 is a photograph when only the glass coating layer was formed in order to facilitate understanding of the state of the glass coating layer. FIG. 7 is a schematic cross-sectional view taken along the line VII-VII in FIG. 3.

First, a description is given of the structure of the ceramic electronic component 1 with reference to FIGS. 1 to 7.

As shown in FIGS. 1 to 3 and 7, the ceramic electronic component 1 includes a ceramic body 10. The ceramic body 10 is made of an appropriate ceramic material according to the function of the ceramic electronic component 1. Specifically, if the ceramic electronic component 1 is a capacitor, the ceramic body 10 can be made of a dielectric ceramic material. Specific non-limiting examples of the dielectric ceramic material include $BaTiO_3$, $CaTiO_3$, $SrTiO_3$, and $CaZrO_3$. If the ceramic body 10 contains a dielectric ceramic material, in addition to the above ceramic material as a major component, an accessory component or components, such as a Mn compound, a Mg compound, a Si compound, a Fe compound, a Cr compound, a Co compound, a Ni compound, or a rare earth compound, may be appropriately added to the ceramic body 10 depending upon desired properties of the resultant ceramic electronic component 1.

No particular limitation is placed on the shape of the ceramic body 10. In this preferred embodiment, the ceramic body 10 preferably has rectangular box shape, for example. As shown in FIGS. 1 to 3, the ceramic body 10 includes first and second principal surfaces 10a and 10b extending along the length direction L and the width direction W. The ceramic body 10 also includes, as shown in FIGS. 1, 2, and 7, first and second side surfaces 10c and 10d extending along the thickness direction T and the length direction L. In addition, as shown in FIGS. 2, 3, and 7, the ceramic body 10 also includes first and second end surfaces 10e and 10f extending along the thickness direction T and the width direction W.

The term "rectangular box shape" used herein includes any rectangular box shape having rounded corners and ridges. In other words, the "rectangular box-shaped" member includes every member having the first and second principal surfaces, the first and second side surfaces, and the first and second end surfaces. Furthermore, all or some of the principal surfaces, side surfaces, and end surfaces may have asperities.

No particular limitation is placed on the dimensions of the ceramic body 10. However, where the thickness of the ceramic body 10 is represented by $D_T$, the length thereof is represented by $D_L$, and the width thereof is represented by $D_W$, the ceramic body 10 may preferably have a thin shape satisfying that $D_T<D_W<D_L$, $(1/5)D_W \leq D_T \leq (1/2)D_W$ or $D_T<0.3$ mm, for example. Specifically, the ceramic body 10 may preferably satisfy that $0.05$ mm$\leq D_T<0.3$ mm, $0.4$ mm$\leq D_L \leq 1$ mm, and $0.3$ mm$\leq D_W \leq 0.5$ mm, for example.

As shown in FIGS. 3 and 7, the interior of the ceramic body 10 includes a plurality of rectangular or approximately rectangular first internal electrodes 11 and a plurality of rectangular or approximately rectangular second internal electrodes 12. The first and second internal electrodes 11 and 12 are alternately arranged at regular intervals in the thickness direction T. The first and second internal electrodes 11 and 12 are exposed at their ends 11a and 12a on the surface of the ceramic body 10. Specifically, the first internal electrodes 11 are exposed at their first ends 11a on the first end surface 10e of the ceramic body 10. The second internal electrodes 12 are exposed at their second ends 12a on the second end surface 10f of the ceramic body 10.

The first and second internal electrodes 11 and 12 are parallel or approximately parallel with the first and second principal surfaces 10a and 10b. Each pair of adjacent first and second internal electrodes 11 and 12 face each other in the thickness direction T with a ceramic layer 10g interposed therebetween.

No particular limitation is placed on the thickness of the ceramic layer 10g. The thickness of the ceramic layer 10g may be about 0.5 μm to about 10 μm, for example. No particular limitation is also placed on the thickness of each of the first and second internal electrodes 11 and 12. The thickness of each of the first and second internal electrodes 11 and 12 may be about 0.2 μm to about 2 μm, for example.

The first and second internal electrodes 11 and 12 can be made of any appropriate electrically conductive material. For example, the first and second internal electrodes 11 and 12 can be made of a metal, such as Ni, Cu, Ag, Pd or Au, or an alloy containing one or more of these metals, such as Ag—Pd alloy.

As shown in FIG. 4, glass coating layers 15 are provided on the surface of the ceramic body 10. The glass coating layers 15 cover portions of the ceramic body 10 on which the first and second internal electrodes 11 and 12 are exposed. Specifically, the glass coating layers 15 are provided on the first and second end surfaces 10e and 10f of the ceramic body 10, both ends of each of the first and second principal surfaces 10a and 10b in the length direction L, and both ends of each of the first and second side surfaces 10c and 10d in the length direction L.

As shown in FIGS. 5 and 6, the glass coating layer 15 is a composite film in which the glass medium 15b and the metal powder particles 15a are integrally bonded. The glass medium 15b in the glass coating layer 15 is obtained by thermally treating glass powder particles forming the glass medium 15b at a softening point or higher temperature to melt it and then solidifying the molten glass into a single piece. Thus, the glass medium 15b exists to fill the spaces between the metal powder particles 15a. Concurrently, by solidifying the melt of the glass powder particles forming the glass medium 15b into a single piece, the glass medium 15b seals the surface of the ceramic body 10. Thus, the ceramic body 10 and the glass coating layer 15 are bonded together in close contact with each other. In addition, the glass medium 15b on the surface of the ceramic body 10 becomes densified to improve the moisture resistance of the ceramic electronic component 1. Note that FIGS. 5 and 6 are views in certain cross sections and the other cross sections may show different views.

The content of the glass medium 15b in the glass coating layer 15 is preferably about 30.2% to about 47.1% by volume. In this case, the adhesion strength between the glass coating layer 15 and the first and second electrode terminals 13 and 14 and the adhesion strength between the glass coating layer 15 and the ceramic body 10 become high. If the content of the glass medium 15b in the glass coating layer 15 is less than about 30.2% by volume, this may reduce the effect of improving the moisture resistance of the ceramic electronic component 1 owing to the existence of the glass coating layer 15. On the contrary, if the content of the glass medium 15b in the glass coating layer 1 is more than about 47.1% by volume, this may make it difficult to form first and second electrode terminals 13 and 14 directly on the associated glass coating layers 15.

The glass forming the glass medium 15b preferably contains, for example, one or more network formers selected from the group consisting of $B_2O_3$ and $SiO_2$ and one or more network modifiers selected from the group consisting of $Al_2O_3$, ZnO, CuO, $Li_2O$, $Na_2O$, $K_2O$, MgO, CaO, BaO, $ZrO_2$, and $TiO_2$.

The glass forming the glass medium 15b preferably contains as the network modifier an oxide of the same metal as the metal powder particles 15a in the glass coating layer 15. Thus, the glass powder particles in the glass coating layer 15 are easily wet with the metal powder particles 15a in the glass coating layer 15.

The glass forming the glass medium 15b preferably contains $SiO_2$ as the highest content component. The rate of $SiO_2$ in the total amount of the glass is preferably about 35% by mole or more.

In the glass coating layers 15, the metal powder particles 15a are dispersed in the glass medium 15b. The rate of the metal powder particles 15a in the glass coating layer 15 is preferably about 25% to about 65% by volume and more preferably about 50% to about 60% by volume, for example. For example, the metal powder particles 15a can be made of one or more metals selected from the group consisting of Ni, Cu, Ag, Pd, Au, and alloys containing one or more of these metals, such as Ag—Pd alloy. The metal powder particles 15a preferably do not contain as a major component the same metal as the metal contained as a major component in the first and second internal electrodes 11 and 12. In other words, the major component of the metal powder particles 15a is preferably different from that of the first and second internal electrodes 11 and 12. If the metal powder particles 15a contain the same metal as the metal contained as a major component in the first and second internal electrodes 11 and 12, the content of the metal is preferably about 10% or less of the total volume of the metal powder particles 15a. The metal powder particles 15a preferably include a core made of Cu, for example.

The glass coating layer 15 is different from a sintered metal film obtained by firing an electrically conductive paste layer and made of a sintered metal and a glass. Specifically, whereas the glass coating layer 15 includes the glass medium 15b continuously arranged to fill the spaces between the metal powder particles 15a, the sintered metal film includes a metal matrix formed therein. Whereas in the glass coating layer 15 all of the metal powder particles 15a are not sintered together and the glass medium 15b exists to join the spaces between the metal powder particles 15a, the glass in the sintered metal film exists as a glass component extruded from the interior of the sintered metal film to the interface between the sintered metal film and the ceramic body by the sintering of the metal powder particles. Alternatively or additionally, the glass may exist at the surface of the sintered metal film as the result of extrusion from the interior to the surface of the sintered metal film due to the sintering of the metal powder particles. In the sintered metal film obtained by firing the electrically conductive paste layer, substantially all of the metal powder particles are sintered and substantially no unsintered metal powder particles exist.

The metal powder particles 15a preferably have an elongated shape as viewed in cross section along the thickness direction of the glass coating layer 15. The metal powder particles 15a are preferably in flake form, such as scaly, flat or acicular form, as viewed in cross section along the thickness direction of the glass coating layer 15. The elongated shape herein indicates that the aspect ratio preferably is about 3 or more.

The aspect ratio of the metal powder particles 15a is preferably not less than about 3.6 and more preferably not less than about 7.4, for example. The aspect ratio of the metal powder particles 15a is preferably not more than about 14.2, for example.

Figure 8:
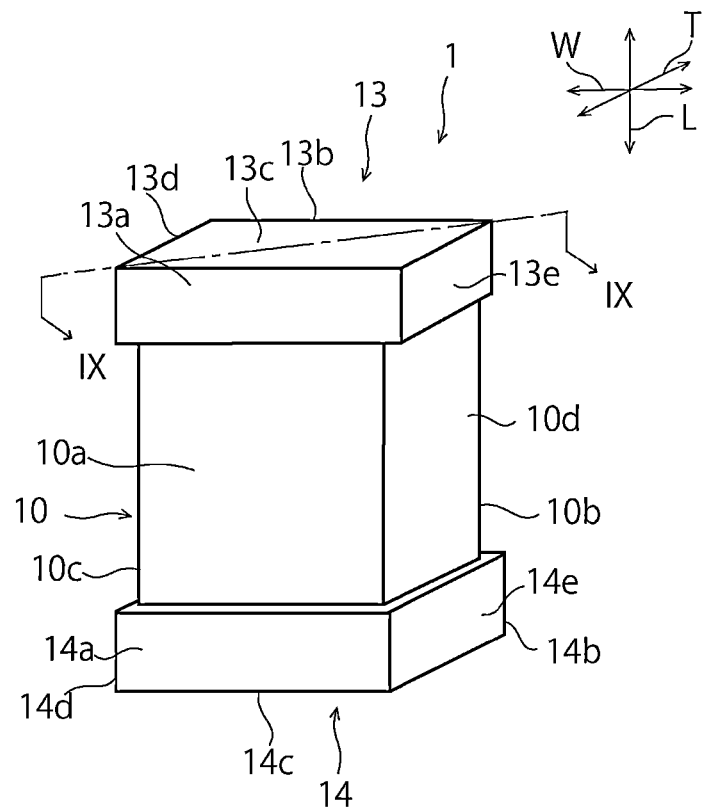
FIG. 8 is a schematic view for illustrating a method for determining the aspect ratio of metal powder particles in various preferred embodiments of the present invention.
Figure 9:
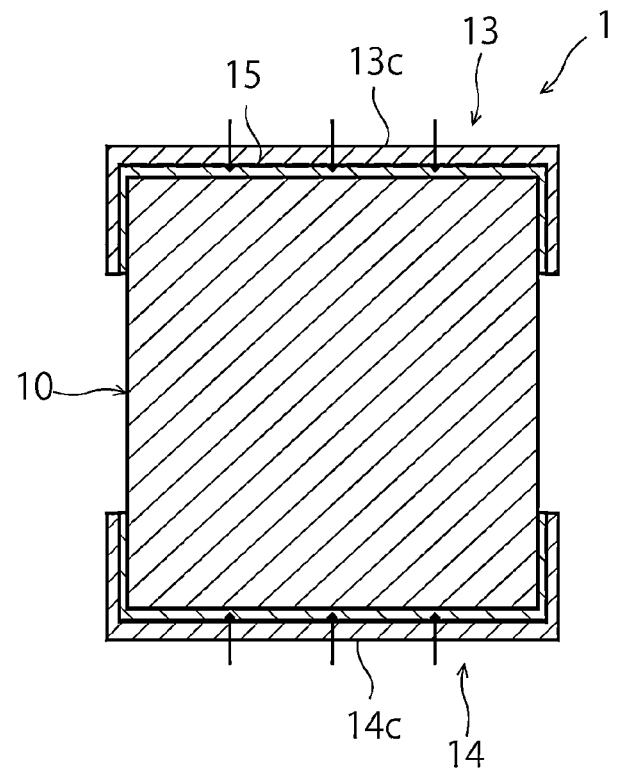
FIG. 9 is a schematic cross-sectional view taken along the line IX-IX in FIG. 8.

The "aspect ratio of the metal powder particles" herein is a value obtained through a determination in the following manner: First, the ceramic electronic component 1 is ground from one of the ridges toward the line IX-IX connecting a pair of opposing corners of a third portion 13c of the first electrode terminal 13 shown in FIG. 8 to expose a cross section of the glass coating layer 15 as shown in FIG. 9. Next, the resultant cross section is divided into four equal portions in the direction of the line IX-IX as shown in FIG. 9 and the glass coating layer 15 is observed at the three boundary sites between the adjacent portions using a SEM at a magnification of ×5000 and an accelerating voltage of 15 kV. Next, in the SEM observation at each of the three sites, all of the metal powder particles 15a within a field of 30 μm by 30 μm are measured in terms of diameter on the exposed cross section and the maximum of the measured values is selected as the long diameter. Next, in the metal powder particle 15a having the selected long diameter, the maximum of thicknesses along the axis perpendicular to the axis of the long diameter is selected as the short diameter. By dividing the long diameter by the short diameter, the aspect ratio of this metal powder particle 15a is calculated. Likewise, as shown by the arrows in FIG. 9, the aspect ratios of metal powder particles 15a are calculated also in the glass coating layer 15 of a third portion 14c of the second electrode terminal 14. In this manner, a total of six aspect ratios of metal powder particles 15a are calculated in both the glass coating layers 15 of the first and second electrode terminals 13 and 14. The average value of these six aspect ratios is used as the aspect ratio of the metal powder particles 15a in various preferred embodiments of the present invention. Note that if in the SEM observations a plurality of metal powder particles 15a are contiguous with one another in the direction of their long diameters and thus can be observed as a single integral metal powder particle 15a, the long diameter of the entire integral unit of the plurality of metal powder particles 15a is regarded as the long diameter of a single metal powder particle 15a.

The metal powder particles 15a preferably have an average particle size of about 0.5 μm to about 10 μm, for example. The average particle size of the metal powder particles 15a in the present invention refers to an average value of the long and short diameters of the six metal powder particles measured in the above manner, that is, a value obtaining by adding up all the measured long and short diameters of the six metal powder particles and dividing the total by 12.

The metal powder particles 15a form conduction paths electrically connecting the first and second internal electrodes 11 and 12 with the first and second electrode terminals 13 and 14, respectively. At least one of the conduction paths is arranged so that a plurality of the metal powder particles 15a are contiguous with one another across the thickness of the glass coating layer 15.

The conduction path may be non-linear as viewed in cross section along the thickness direction of the glass coating layer 15. The conduction path may preferably include a plurality of relatively narrow portions and a plurality of relatively thick portions.

The long diameter of the metal powder particles 15a defining the conduction paths is preferably equal to or larger than the thickness of the glass coating layer 15. The long diameter of the metal powder particles 15a defining the conduction paths is more preferably about 1.5 or more times the thickness of the glass coating layer 15.

The glass coating layer 15 preferably has a thickness of about 1 μm to about 10 μm. If the thickness of the glass coating layer 15 is less than about 1 μm, this may reduce the effect of improving the moisture resistance of the ceramic electronic component 1 owing to the existence of the glass coating layer 15. If the thickness of the glass coating layer 15 is more than about 10 μm, the absolute amount of glass contained in the glass coating layer 15 becomes large. Thus, the components forming the first and second internal electrodes 11 and 12 are likely to diffuse in liquid phase in molten glass of the glass coating layer 15. In this case, the distal ends of the first and second internal electrodes 11 and 12 will be thin, so that gaps may be created between the first and second internal electrodes 11 and 12 and the adjacent ceramic layers 10g to decrease the moisture resistance of the ceramic electronic component 1.

The first and second internal electrodes 11 and 12 may partly project from the surface of the ceramic body 10 to enter the glass coating layers 15 but preferably should not pass through the glass coating layers 15.

It is preferred that in the vicinity of the surface of the ceramic body 10, there should be substantially no reaction layer formed by the reaction of the glass contained in the glass coating layer 15 with the ceramic material contained in the ceramic body 10. In forming the glass coating layer 15, thermal treatment at about 800° C. or higher temperature will cause the ceramic component of the ceramic body 10 to diffuse into the glass of the glass coating layer 15, which may result in the formation of a reaction layer and thus decrease the mechanical strength of the ceramic body 10. The reason for this can be that because of ease of dissolution of the reaction layer in a plating solution, chemical corrosion occurs when a plating film is formed on the glass coating layer 15.

The first electrode terminal 13 is provided directly on the associated glass coating layer 15. The first electrode terminal 13 is electrically connected to the first internal electrodes 11 via the conduction paths located in the glass coating layer 15. The first electrode terminal 13 preferably includes a first portion 13a located on the first principal surface 10a; a second portion 13b located on the second principal surface 10b; a third portion 13c located on the first end surface 10e; a fourth portion 13d located on the first side surface 10c; and a fifth portion 13e located on the second side surface 10d.

The second electrode terminal 14 is provided directly on the associated glass coating layer 15. The second electrode terminal 14 is electrically connected to the second internal electrodes 12 via the conduction paths located in the glass coating layer 15. The second electrode terminal 14 preferably includes a first portion 14a located on the first principal surface 10a; a second portion 14b located on the second principal surface 10b; a third portion 14c located on the second end surface 10f; a fourth portion 14d located on the first side surface 10c; and a fifth portion 14e located on the second side surface 10d.

The first and second electrode terminals 13 and 14 each include a plating film. The plating film is preferably made of at least one metal selected from the group consisting of Cu, Ni, Sn, Pd, Au, Ag, Pt, Bi, and Zn or an alloy containing at least one of these metals. Each of the first and second electrode terminals 13 and 14 may be formed of a monolayer, bilayer or multilayer plating film. For example, the plating film may have a Ni—Sn bilayer structure or a Cu—Ni—Sn trilayer structure. In this preferred embodiment, as shown in FIG. 5, each of the first and second electrode terminals 13 and 14 preferably includes a first layer 13p made of Cu, a second layer 13q made of Ni, and a third layer 13r made of Sn.

Each of the total thickness of the glass coating layer 15 and the first electrode terminal 13 and the total thickness of the glass coating layer 15 and the second electrode terminal 14 is preferably about 15 μm to about 25 μm, for example.

A description is next given of an example of a method for producing the ceramic electronic component 1 of this preferred embodiment.

Figure 10:
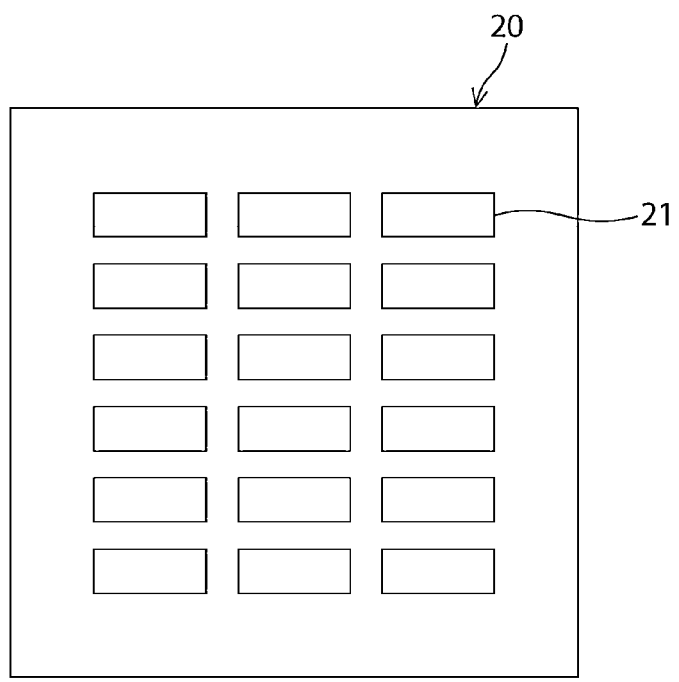
FIG. 10 is a schematic plan view of a ceramic green sheet including an electrical conduction pattern located thereon.

First, a ceramic green sheet 20 (see FIG. 10) is prepared which contains a ceramic material for forming a ceramic body 10. Next, as shown in FIG. 10, an electrically conductive paste is applied on the ceramic green sheet 20 to form an electrically conductive pattern 21. The application of the electrically conductive paste can be performed by various printing processes, such as screen printing. The electrically conductive paste may contain, aside from electrically conductive particles, a known binder and a known solvent.

Next, a plurality of ceramic green sheets 20 with no electrically conductive pattern 21 formed thereon, a ceramic green sheet 20 with an electrically conductive pattern 21 formed in a configuration corresponding to the first or second internal electrodes 11, 12, and a plurality of ceramic green sheets 20 with no electrically conductive pattern 21 formed thereon are laminated in this order on the first-mentioned ceramic green sheet 20 and then pressed in the laminating direction to produce a mother laminate.

Next, the mother laminate is cut along imaginary cutting lines to produce a plurality of green ceramic laminates from the mother laminate.

The cutting of the mother laminate can be performed by dicing or press cutting. The ridges and corners of the green ceramic laminates may be rounded such as by barrel polishing.

Next, each of the green ceramic laminates is fired. In this firing step, the first and second internal electrodes 11 and are fired. The firing temperature can be appropriately selected depending upon the types of the ceramic material and electrically conductive paste used. The firing temperature may be about 900° C. to about 1300° C., for example.

Next, a glass paste is applied on relevant regions of each of the fired ceramic laminates, such as by dipping. Next, the glass paste is thermally treated to melt the glass powder into integral molten material and the molten material is cooled to form each glass coating layer 15. The glass paste used for the formation of the glass coating layer 15 contains glass powder particles, metal powder particles 15a, a binder, a solvent, and so on. Here, the glass powder particles used are preferably those having a smaller particle size than the metal powder particles 15a. Preferably, the thermal treatment temperature is equal to or higher than the softening temperature of the glass powder particles and is a temperature does not cause the metal powder particles to sinter.

For example, the thermal treatment temperature is preferably about 600° C. to about 800° C. and more preferably about 600° C. to about 750° C. With such a thermal treatment temperature, the length of the projections of the first and second internal electrodes 11 and 12 in the glass coating layer 15 can be prevented from exceeding about 2 μm. If the thermal treatment temperature is lower than about 600° C., the glass will not soften, so that the adhesion to the ceramic body 10 may be decreased. If the thermal treatment temperature is higher than about 750° C., the length of the projections of the first and second internal electrodes 11 and 12 in the glass coating layer 15 will be likely to exceed about 35% of the thickness of the glass coating layer 15. In addition, the reaction between the ceramic body 10 and the glass coating layers 15 may be initiated to cause the glass coating layers 15 to disappear.

Next, the glass coating layers 15 are plated to form the first and second electrode terminals 13 and 14. In the above manner, a ceramic electronic component 1 can be produced.

An example of a sample ceramic electronic component 1 actually produced according to this preferred embodiment was produced in the following manner:

Dimensions of ceramic body after firing (design values): 1.0 mm length by 0.5 mm width by 0.11 mm thickness
Ceramic material: BaTiO$_3$
Thickness of ceramic layer after firing (design value): 0.9 μm
Material of internal electrode: Ni
Thickness of internal electrode after firing (design value): 0.6 μm
Total number of internal electrodes: 45
Firing condition: keeping at 1200° C. for 2 hours
Capacity of ceramic electronic component: 0.47 μF
Rated voltage of ceramic electronic component: 4 V
Metal powder particles contained in glass coating layer 15: Cu powder particles
Average particle size of Cu powder particles: 3 μm
Form of Cu powder particles: flat
Aspect ratio of Cu powder particles: 8
Major component of glass powder particles in glass paste: borosilicate glass
Average particle size of glass powder particles: 1 μm
Ratio of Cu powder particles to glass powder particles in total solids of glass paste: 50% to 50% by volume
Condition of thermal treatment: 680° C.
Plating film: Cu film (6 μm thickness), Ni film (3 μm thickness), and Sn film (3 μm thickness) are formed in this order on glass coating layer 15.

As a comparative example, a sample ceramic electronic component having a sintered metal film formed by applying and baking an electrically conductive paste on a ceramic body was produced in the following manner:

Dimensions of ceramic body: 1.0 mm length by 0.5 mm width by 0.15 mm thickness
Ceramic material: BaTiO3
Thickness of ceramic layer (after firing): 0.88 μm
Number of laminated ceramic green sheets: 386
Thickness of external layer after firing: 35 μm (F5.0×9)
Capacity: 0.47 μF
Rated voltage: 4 V
Firing condition: keeping at 680° C. for 2 hours
Structure of external electrode: sintered metal film
Particle size of Cu powder particles in electrically conductive paste: 3 μm in spherical form
Glass component: borosilicate glass
Glass particle size: 1 μm
Glass shape: irregular (pulverized glass)
Ratio of Cu powder particles to glass powder particles in total solids of electrically conductive paste: 75% to 25% by volume The two types of samples obtained in the above manners were subjected to a humidity stress test in the following manner. Each sample was mounted on a glass epoxy substrate using eutectic solder. Thereafter, the samples were subjected to an accelerated humidity stress test at a voltage of 2 V for 72 hours in a high-temperature (125° C.) and high-humidity (95% RH) chamber. Among them, samples having an insulation resistance value (IR value) reduced by two or more digits were regarded as those deteriorated in moisture resistance. The numbers of samples deteriorated in moisture resistance in different cases are shown in TABLE 1.

The thickness of the glass coating layer in each of the samples obtained in the above manners was measured by grinding the LT surface of each sample to the midportion thereof (the middle of the W dimension) along the length direction L to form a cross section and observing the thickness of the glass coating layer 15 located in the middle of the end surface of one of the electrode terminals in the formed cross section using an optical microscope. Each value of "Thickness of Glass Coating Layer" shown in TABLE 1 is an average value of the measured thicknesses of the glass coating layers in 20 samples in each case. Note that data in "Without glass coating layer" in TABLE 1 shows data when no glass coating layer was formed and a plating film was formed directly on a ceramic body.

TABLE 1

| | Examples: | | | | | |
| --- | --- | --- | --- | --- | --- | --- |
| | Thickness of Glass Coating Layer | | | | | |
| | 1 μm | 2 μm | 5 μm | 10 μm | 15 μm | Without glass coating layer |
| Number of Samples Deteriorated in Moisture Resistance/Total Number of Samples | 0/20 | 0/20 | 0/20 | 0/20 | 2/20 | 7/20 |

TABLE 2

Comparative Examples:

| | Thickness of Sintered Metal Film | | |
|---|---|---|---|
| | 10 μm or less | 15 μm | 20 μm |
| Number of Samples Deteriorated in Moisture Resistance/Total Number of Samples | (Failure to form sintered metal film) | 4/20 | 0/20 |

The reason why the moisture resistance was low when the thickness of the sintered metal film was about 15 μm can be that since the thickness of the sintered metal film formed on the principal surface of the ceramic body was small, moisture was likely to enter the ceramic body from a thin-walled portion of the sintered metal film located on the principal surface of the ceramic body.

For the sintered metal films with a thickness of about 10 μm or less, they were designed to contain sufficient amounts of metal powder particles and glass and thus have a large total solid content, which increased the viscosity to end up in failure to form sintered metal films with a thickness of about 10 μm or less.

As described previously, in this preferred embodiment, the glass coating layers 15 cover portions of the surface of the ceramic body 10 on which the first and second internal electrodes and 12 are exposed. Therefore, as compared with the case where external electrodes are formed only of a plating film, moisture is less likely to enter the interior of the ceramic body from the exposed portions of the first and second internal electrodes 11 and 12, which improves the moisture resistance. Furthermore, also as compared with conventional products having external electrodes made of a sintered metal film, the electrode terminals can be formed thinner and have more superior moisture resistance. Hence, the ceramic electronic component 1 of this preferred embodiment has superior moisture resistance.

Six types of samples of the ceramic electronic component 1 (content of glass powder in the total solids of the glass paste: 42.5% by volume) were produced as inventive examples, for each type, by thermally treating their glass pastes at approximately 550° C., 600° C., 650° C., 700° C., 750° C., and 800° C., respectively. The glass coating layer in each sample had a thickness of 7 μm. The second portions 13b and 14b of the first and second electrode terminals 13 and 14 of each sample were bonded to the land of a glass epoxy resin substrate using an electrically-conductive adhesive. Next, an adhesive tape (Cellophane tape No. 252 manufactured by SEKISUI CHEMICAL CO., LTD.) was attached to the first portions 13a and 14a of the first and second electrode terminals 13 and 14 of the sample. Next, the adhesive tape was pulled with a certain force along the length direction L of the sample. If upon pulling of the adhesive tape the glass coating layer was peeled off from the ceramic body, this sample was considered no good ("NG"). The test results are shown in TABLE 3. Six types of samples having a sintered metal film formed using an electrically conductive paste like the humidity stress test were produced as comparative examples and likewise subjected to Tape Peel Test 1. Note that in these comparative examples the sintered metal films had a thickness of 20 μm and the electrode terminals were thermally treated under the same conditions as in the inventive examples. In the comparative examples, the samples whose sintered metal films were peeled off from their associated ceramic bodies were considered "NG". TABLE 3 shows the respective ratios of the number of NGs in Tape Peel Test 1 to the total number of samples in the inventive examples in which a plating film was provided on the glass coating layer and the comparative examples in which a sintered metal film was provided on the ceramic body.

TABLE 3

| | Thermal Treatment Temperature | | | | | |
|---|---|---|---|---|---|---|
| | 550° C. | 600° C. | 650° C. | 700° C. | 750° C. | 800° C. |
| Glass Coating Layer + Plating Film | 7/20 | 0/20 | 0/20 | 0/20 | 0/20 | 0/20 |
| Sintered Metal Film | 10/20 | 12/20 | 5/20 | 3/20 | 0/20 | 0/20 |

TABLE 3 reveals that if a plating film is provided on the glass coating layer, the thermal treatment temperature at about 600° C. to about 800° C. enables further increase in adhesion strength between the glass coating layer and the ceramic body. This is because the glass in the glass coating layer and the ceramic component in the ceramic body are bonded together by covalent bonding through oxygen atoms. The reason why failures occurred in Tape Peel Test 1 at a thermal treatment temperature of below 600° C. can be that the glass did not sufficiently soften.

On the other hand, if a sintered metal film was provided on the ceramic body, failures occurred in Tape Peel Test 1 at about 700° C. and lower thermal treatment temperatures. The reason for this can be that the sintered metal film contained only a small amount of component serving as an adhesive for the glass or the like.

Twelve types of samples similar to those used in the above Tape Peel Test 1 were prepared, twenty for each type. Each sample was placed with its second principal surface 10b down on a stage. Next, a pressing head was pressed against a center portion of the first principal surface 10a of the sample, the load applied to the sample was gradually increased, and the value of load at the breakage of the sample (transverse rupture strength (N)) was measured. For each sample type, an average of the measured values of twenty samples was calculated and considered as the transverse rupture strength (N). A load cell and an instrumentation amplifier used in the transverse test were MODEL-3005 and MODEL-1015A, respectively, both manufactured by AIKOH ENGINEERING CO., LTD. The test results are shown in TABLE 4. In TABLE 4, the transverse rupture strength determined from the samples as the inventive examples subjected to thermal treatment at about 650° C. was represented as 100%.

In SEM observation of each of the samples subjected to thermal treatment at approximately 550° C., 600° C., 650° C., and 700° C., no reaction layer described previously was found near the surface of the ceramic body 10. On the other hand, in SEM observation of each of the samples subjected to thermal treatment at about 750° C., the reaction layer described previously was observed at the interface between the glass coating layer 15 and the ceramic body 10.

TABLE 4

| | Thermal Treatment Temperature | | | | | |
|---|---|---|---|---|---|---|
| | 550° C. | 600° C. | 650° C. | 700° C. | 750° C. | 800° C. |
| Glass Coating Layer + Plating Film | 95% | 103% | 100% | 98% | 85% | 52% |
| Sintered Metal Film | 98% | 102% | 92% | 94% | 70% | 40% |

A sintered metal film generally contains necked metal particles. However, in the comparative examples in which the thermal treatment temperature was not more than about 750° C., the metal particles could not be sufficiently necked, resulting in failure to provide the structure of a sintered metal film. Furthermore, as seen from the results shown in TABLES 3 and 4, the comparative examples using a sintered metal film have difficulty achieving both of a sufficiently high peel strength and a sufficiently high transverse rupture strength even if the thermal treatment temperature is changed.

Figure 18:
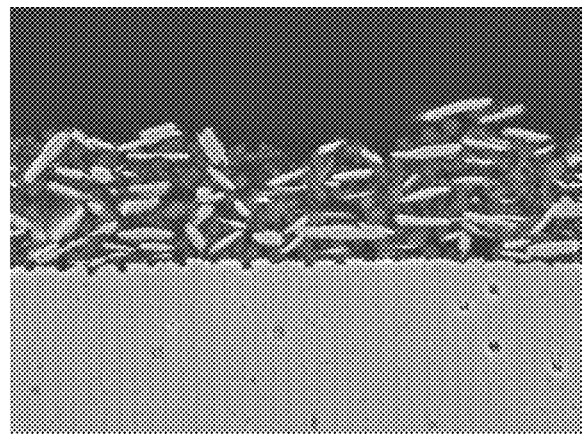
FIG. 18 is a photograph of a cross section of a glass paste layer obtained when the thermal treatment temperature was about 600° C. and the content of glass powder in the total solids of the glass paste was about 42.5% by volume.

Five types of samples of the ceramic electronic component 1 were produced, 20 for each type, in which their respective contents of glass powders in the total solids of the glass pastes were approximately 57.5%, 50.0%, 42.5%, 35.0%, and 25.0% by volume and the thermal treatment temperature of the glass pastes was about 600° C. The remainder of the solids in the glass paste was Cu powder particles. Next, each sample was subjected to Tape Peel Test 2 in the same manner as in Tape Peel Test 1. The test results are shown in TABLE 5. FIG. 18 shows a photograph of a cross section of a glass paste layer obtained when the thermal treatment temperature was about 600° C. and the content of glass powder in the total solids of the glass paste was about 42.5% by volume.

The content of glass in the glass coating layer 15 of each sample was determined in the following manner. The LT surface of the sample was ground to a midportion of the W dimension to form a cross section. The glass coating layer 15 located in the middle of one end surface in the formed cross section was observed by SEM. Using the SEM image (5000-fold magnification and 15 kV accelerating voltage), a 30-μm-long line perpendicular to the internal electrodes was drawn at the middle of the thickness of the glass coating layer 15 and the respective total lengths of glass portions and Cu portions on the line were measured. From the ratio between the length of Cu portions and the length of glass portions, the respective contents of Cu and glass in the glass coating layer 15 were determined.

TABLE 5

| | Content of Glass Powder in Total Solids of Glass Paste | | | | |
|---|---|---|---|---|---|
| | 57.5% by volume | 50.0% by volume | 42.5% by volume | 35.0% by volume | 25.0% by volume |
| Content of Glass in Glass Coating Layer 15 | 52.5% by volume | 47.1% by volume | 37.2% by volume | 30.2% by volume | 19.5% by volume |
| Rate of NG | 0/20 | 0/20 | 0/20 | 0/20 | 12/20 |

Five types of samples similar to those used in the above Tape Peel Test 2 were prepared. Next, each sample was subjected to Transverse Test 2 in the same manner as in the above Transverse Test 1. The test results are shown in TABLE 6. In TABLE 6, the transverse rupture strength determined from the samples in which the content of glass powder in the total solids of glass paste was about 42.5% by volume was represented as 100%.

TABLE 6

| | Content of Glass Powder in Total Solids of Glass Paste | | | | |
|---|---|---|---|---|---|
| | 57.5% by volume | 50.0% by volume | 42.5% by volume | 35.0% by volume | 25.0% by volume |
| Content of Glass in Glass Coating Layer 15 | 52.5% by volume | 47.1% by volume | 37.2% by volume | 30.2% by volume | 19.5% by volume |
| Transverse Rupture Strength | 82% | 105% | 100% | 91% | 95% |

Figure 19:
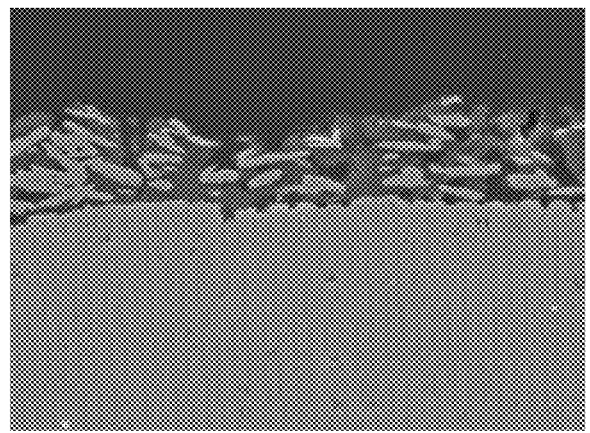
FIG. 19 is a photograph of a cross section of a glass paste layer obtained when the thermal treatment temperature was about 650° C. and the content of glass powder in the total solids of the glass paste was about 42.5% by volume.

Samples were produced and subjected to Tape Peel Test 3 in the same manner as in Tape Peel Test 2 except that the thermal treatment temperature for the glass paste was about 650° C. The test results are shown in TABLE 7. FIG. 19 shows a photograph of a cross section of a glass paste layer obtained when the thermal treatment temperature was about 650° C. and the content of glass powder in the total solids of the glass paste was about 42.5% by volume.

TABLE 7

| | Content of Glass Powder in Total Solids of Glass Paste | | | | |
|---|---|---|---|---|---|
| | 57.5% by volume | 50.0% by volume | 42.5% by volume | 35.0% by volume | 25.0% by volume |
| Content of Glass in Glass Coating Layer 15 | 52.5% by volume | 47.1% by volume | 37.2% by volume | 30.2% by volume | 19.5% by volume |
| Rate of NG | 0/20 | 0/20 | 0/20 | 0/20 | 5/20 |

Five types of samples similar to those used in the above Tape Peel Test 3 were prepared. Next, each sample was subjected to Transverse Test 3 in the same manner as in the above Transverse Test 2. The results are shown in TABLE 8. The thermal treatment temperature was about 650° C.

TABLE 8

| | Content of Glass Powder in Total Solids of Glass Paste | | | | |
|---|---|---|---|---|---|
| | 57.5% by volume | 50.0% by volume | 42.5% by volume | 35.0% by volume | 25.0% by volume |
| Content of Glass in Glass Coating Layer 15 | 52.5% by volume | 47.1% by volume | 37.2% by volume | 30.2% by volume | 19.5% by volume |
| Transverse Rupture Strength | 70% | 95% | 100% | 102% | 96% |

Figure 20:
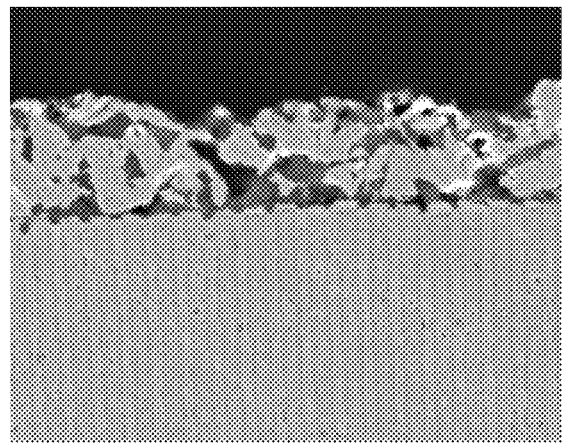
FIG. 20 is a photograph of a cross section of a glass paste layer obtained when the thermal treatment temperature was about 700° C. and the content of glass powder in the total solids of the glass paste was about 35.0% by volume.
Figure 21:
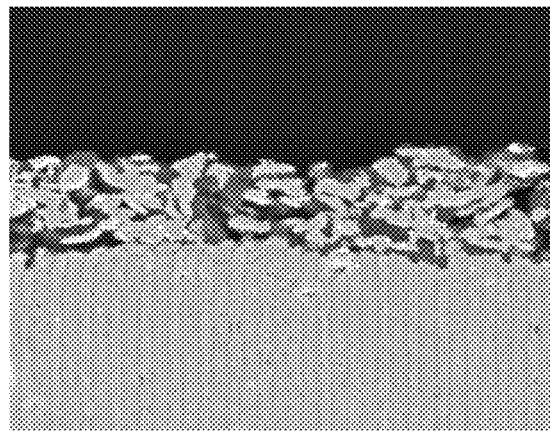
FIG. 21 is a photograph of a cross section of a glass paste layer obtained when the thermal treatment temperature was about 700° C. and the content of glass powder in the total solids of the glass paste was about 42.5% by volume.
Figure 22:
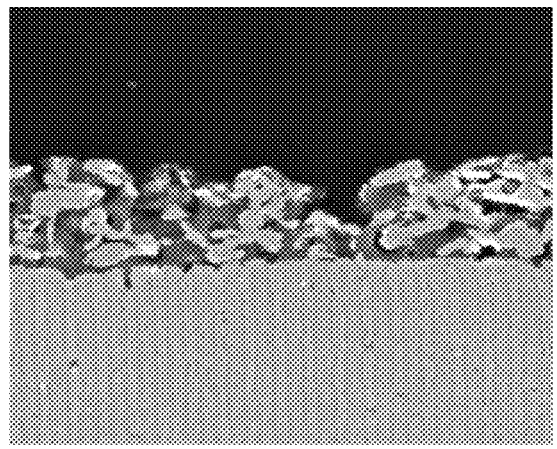
FIG. 22 is a photograph of a cross section of a glass paste layer obtained when the thermal treatment temperature was about 700° C. and the content of glass powder in the total solids of the glass paste was about 50.0% by volume.
Figure 23:
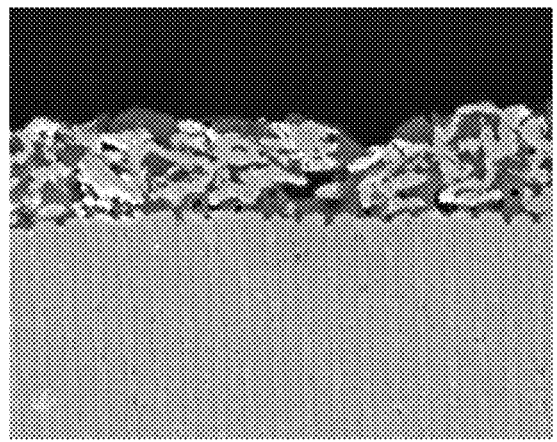
FIG. 23 is a photograph of a cross section of a glass paste layer obtained when the thermal treatment temperature was about 700° C. and the content of glass powder in the total solids of the glass paste was about 57.5% by volume.

Samples were produced and subjected to Tape Peel Test 4 in the same manner as in Tape Peel Test 2 except that the thermal treatment temperature for the glass paste was about 700° C. The test results are shown in TABLE 9. FIG. 20 shows a photograph of a cross section of a glass paste layer obtained when the thermal treatment temperature was about 700° C. and the content of glass powder in the total solids of the glass paste was about 35.0% by volume. FIG. 21 shows a photograph of a cross section of a glass paste layer obtained when the thermal treatment temperature was about 700° C. and the content of glass powder in the total solids of the glass paste was about 42.5% by volume. FIG. 22 shows a photograph of a cross section of a glass paste layer obtained when the thermal treatment temperature was about 700° C. and the content of glass powder in the total solids of the glass paste was about 50.0% by volume. FIG. 23 shows a photograph of a cross section of a glass paste layer obtained when the thermal treatment temperature was about 700° C. and the content of glass powder in the total solids of the glass paste was about 57.5% by volume.

TABLE 9

| | Content of Glass Powder in Total Solids of Glass Paste | | | | |
|---|---|---|---|---|---|
| | 57.5% by volume | 50.0% by volume | 42.5% by volume | 35.0% by volume | 25.0% by volume |
| Content of Glass in Glass Coating Layer 15 | 52.5% by volume | 47.1% by volume | 37.2% by volume | 30.2% by volume | 19.5% by volume |
| Number of NG Samples/Total Number of Samples | 0/20 | 0/20 | 0/20 | 0/20 | 3/20 |

Five types of samples similar to those used in the above Tape Peel Test 4 were prepared. Next, each sample was subjected to Transverse Test 4 in the same manner as in the above Transverse Test 2. The test results are shown in TABLE 10.

TABLE 10

| | Content of Glass Powder in Total Solids of Glass Paste | | | | |
|---|---|---|---|---|---|
| | 57.5% by volume | 50.0% by volume | 42.5% by volume | 35.0% by volume | 25.0% by volume |
| Content of Glass in Glass Coating Layer 15 | 52.5% by volume | 47.1% by volume | 37.2% by volume | 30.2% by volume | 19.5% by volume |
| Transverse Rupture Strength | 55% | 96% | 100% | 104% | 95% |

Figure 24:
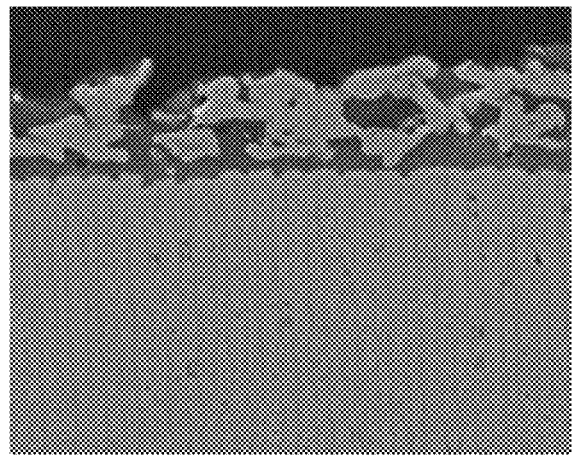
FIG. 24 is a photograph of a cross section of a glass paste layer obtained when the thermal treatment temperature was about 750° C. and the content of glass powder in the total solids of the glass paste was about 42.5% by volume.
Figure 25:
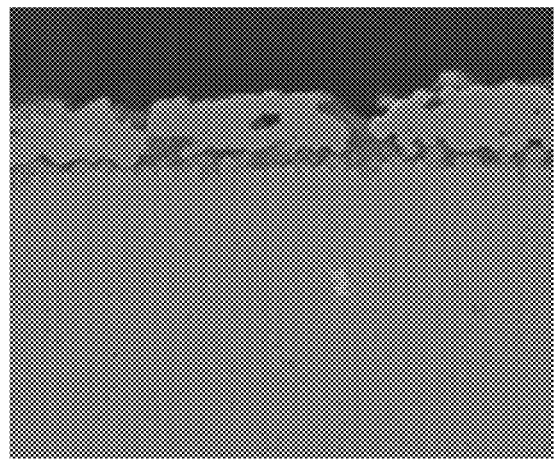
FIG. 25 is a photograph of a cross section of a glass paste layer obtained when the thermal treatment temperature was about 800° C. and the content of glass powder in the total solids of the glass paste was about 42.5% by volume.
Figure 26:
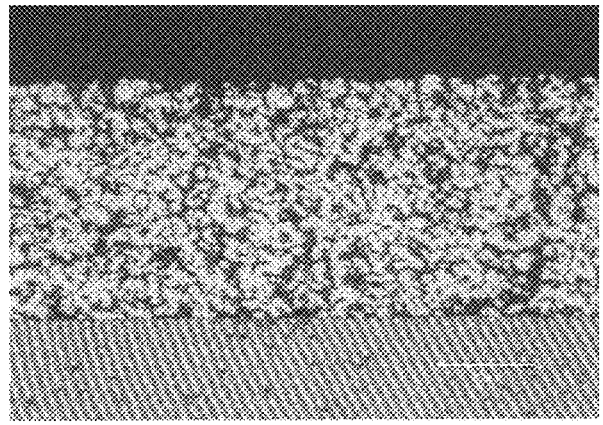
FIG. 26 is a photograph of a cross section of a sintered metal film formed substantially in the same manner as in comparative examples except that the firing temperature was about 600° C. and the thickness was about 20 μm.
Figure 27:
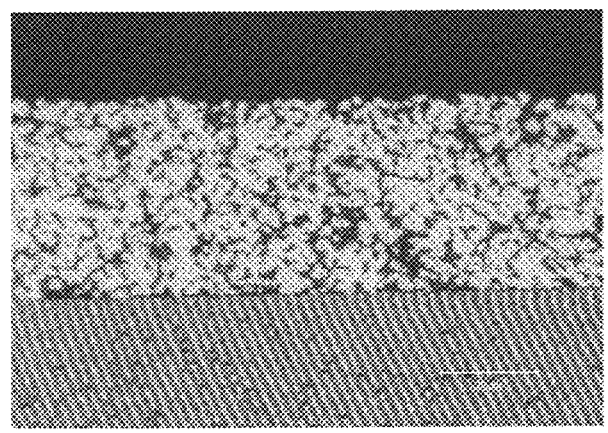
FIG. 27 is a photograph of a cross section of a sintered metal film formed substantially in the same manner as in the comparative examples except that the firing temperature was about 700° C. and the thickness was about 20 μm.
Figure 28:
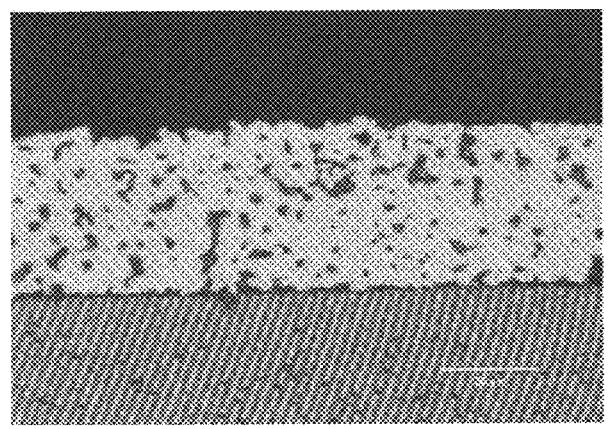
FIG. 28 is a photograph of a cross section of a sintered metal film formed substantially in the same manner as in the comparative examples except that the firing temperature was about 800° C. and the thickness was about 20 μm.

Samples were produced and subjected to Tape Peel Test 5 in the same manner as in Tape Peel Test 2 except that the thermal treatment temperature for the glass paste was about 750° C. The test results are shown in TABLE 11. FIG. 24 shows a photograph of a cross section of a glass paste layer obtained when the thermal treatment temperature was about 750° C. and the content of glass powder in the total solids of the glass paste was about 42.5% by volume. FIG. 25 shows a photograph of a cross section of a glass paste layer obtained when the thermal treatment temperature was about 800° C. and the content of glass powder in the total solids of the glass paste was about 42.5% by volume. FIG. 26 shows a photograph of a cross section of a sintered metal film formed substantially in the same manner as in the comparative examples except that the firing temperature was about 600° C. and the thickness was about 20 µm. FIG. 27 shows a photograph of a cross section of a sintered metal film formed substantially in the same manner as in the comparative examples except that the firing temperature was about 700° C. and the thickness was about 20 µm. FIG. 28 shows a photograph of a cross section of a sintered metal film formed substantially in the same manner as in the comparative examples except that the firing temperature was about 800° C. and the thickness was about 20 µm. The samples shown in FIGS. 26 to 28 measured approximately 1.0 mm by 0.5 mm by 0.5 mm.

TABLE 11

| | Content of Glass Powder in Total Solids of Glass Paste | | | | |
|---|---|---|---|---|---|
| | 57.5% by volume | 50.0% by volume | 42.5% by volume | 35.0% by volume | 25.0% by volume |
| Content of Glass in Glass Coating Layer 15 | 52.5% by volume | 47.1% by volume | 37.2% by volume | 30.2% by volume | 19.5% by volume |
| Number of NG Samples/Total Number of Samples | 0/20 | 0/20 | 0/20 | 0/20 | 0/20 |

Five types of samples similar to those used in the above Tape Peel Test 5 were prepared. Next, each sample was subjected to Transverse Test 5 in the same manner as in the above Transverse Test 2. The test results are shown in TABLE 12.

TABLE 12

| | Content of Glass Powder in Total Solids of Glass Paste | | | | |
|---|---|---|---|---|---|
| | 57.5% by volume | 50.0% by volume | 42.5% by volume | 35.0% by volume | 25.0% by volume |
| Content of Glass in Glass Coating Layer 15 | 52.5% by volume | 47.1% by volume | 37.2% by volume | 30.2% by volume | 19.5% by volume |
| Transverse Rupture Strength | 93% | 97% | 100% | 105% | 102% |

As described previously, in this preferred embodiment, a glass paste containing about 35.0% to about 50.0% by volume glass powder particles per total solids and metal powder particles 15a is applied on portions of the surface of the ceramic body 10 on which the first and second internal electrodes 11 and 12 are exposed, and the glass paste is then thermally treated at about 600° C. to about 800° C. Thus, the glass powder particles in the glass paste can be softened to maintain good adhesion between the ceramic body 10 and the glass coating layer 15 and no reaction layer is formed. Therefore, the ceramic body of the ceramic electronic component 1 can maintain high mechanical strength.

Five types of samples of the ceramic electronic component 1 in which metal powder particles 15a in their respective glass coating layers 15 have different aspect ratios of approximately 1, 3.6, 4.6, 7.4, and 14.2 were produced, two for each type. The thermal treatment temperature for the glass coating layers 15 was set only at about 680° C. because of less dependence of coverage of plating film upon temperature changes. Specifically, for each type of sample, two types of Cu plating films were formed under their respective conditions of application of a current of about 3 A for about 90 minutes and application of a current of about 5 A for about 90 minutes to produce two samples. In both the cases, the coverage (%) of Cu plating film on the glass coating layer 15 was determined. The results are shown in TABLE 13.

TABLE 13

| | | Aspect Ratio of Metal Powder Particles | | | | |
|---|---|---|---|---|---|---|
| | | 1 | 3.6 | 4.6 | 7.4 | 14.2 |
| Plating Condition (90 minutes) | Current value 3A | 36.9% | 71.7% | 80.2% | 93.0% | 97.5% |
| | Current value 5A | 40.2% | 87.5% | 91.9% | 96.8% | 97.3% |

The coverage (%) of Cu plating film was determined in the following manner. A midportion of the first electrode terminal on the first principal surface of each sample was observed by SEM (2000-fold magnification, 15 kV accelerating voltage) to obtain a reflection electron image, the obtained image was binarized, and the rate (%) of the area of Cu plating film with respect to 100% of a field of 50 μm by 50 μm of the image was determined. The average value of the area rates of Cu plating film in five samples was used as the coverage (%). In the above table, the aspect ratio of metal powder particles 15a was determined by the previously-described determination method.

Figure 15:
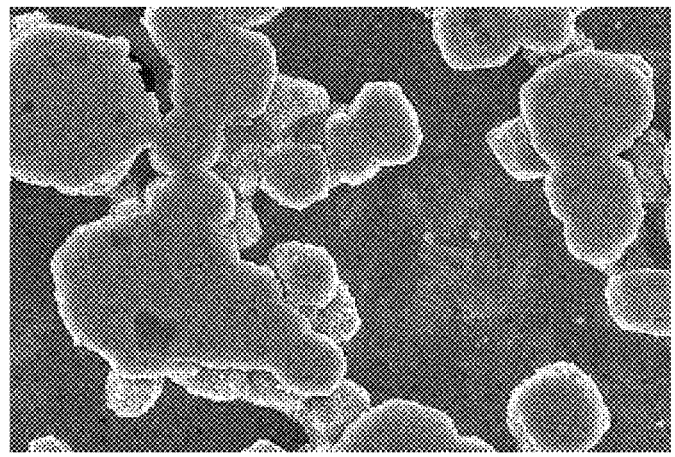
FIG. 15 is a photograph of the surface of a Cu plating film as observed by SEM when the Cu plating film was formed at an aspect ratio of metal powder particles of about 1 and at a current of about 5 A in a production process of the ceramic electronic component of the first preferred embodiment of the present invention.
Figure 16:
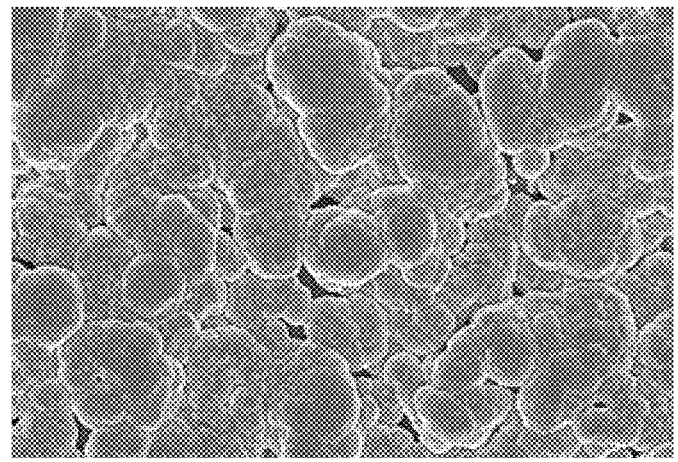
FIG. 16 is a photograph of the surface of a Cu plating film as observed by SEM when the Cu plating film was formed at an aspect ratio of metal powder particles of about 3.6 and at a current of about 5 A in a production process of the ceramic electronic component of the first preferred embodiment of the present invention.
Figure 17:
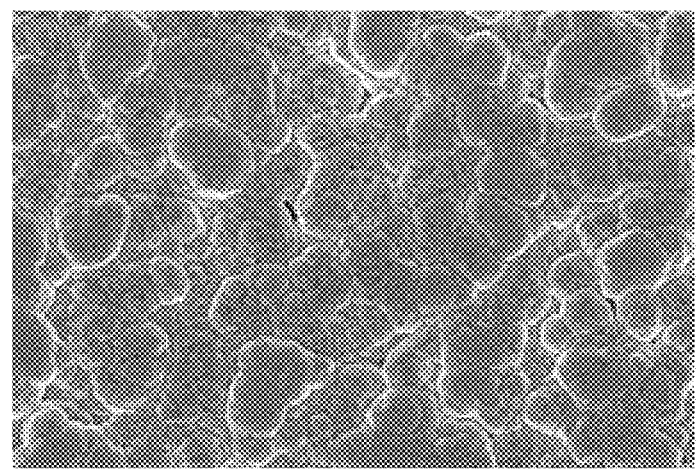
FIG. 17 is a photograph of the surface of a Cu plating film as observed by SEM when the Cu plating film was formed at an aspect ratio of metal powder particles of about 7.4 and at a current of about 5 A in a production process of the ceramic electronic component of the first preferred embodiment of the present invention.

FIG. 15 is a photograph of the surface of a Cu plating film as observed by SEM when the Cu plating film was formed under the conditions of an aspect ratio of metal powder particles 15a of about 1 and a current of about 5 A. FIG. 16 is a photograph of the surface of a Cu plating film as observed by SEM when the Cu plating film was formed under the conditions of an aspect ratio of metal powder particles 15a of about 3.6 and a current of about 5 A. FIG. 17 is a photograph of the surface of a Cu plating film as observed by SEM when the Cu plating film was formed under the conditions of an aspect ratio of metal powder particles 15a of about 7.4 and a current of about 5 A.

As described previously, in this preferred embodiment, the metal powder particles 15a have an elongated shape as viewed in cross section along the thickness direction of the glass coating layer 15. Therefore, the area of the metal powder particles 15a exposed on the surface of the glass coating layer is large. Thus, the coverage of the plating films on the surfaces of the glass coating layers 15 becomes large. Hence, the plating films can be coated in a short period of time even at a small current to increase the efficiency of the plating process and the growth of the plating films in the thickness direction can be suppressed to achieve size reduction of the electronic component.

In addition, when the aspect ratio of the metal powder particles 15a is about 3.6 or more, the above advantageous effects can be significantly achieved.

Hereinafter, other preferred embodiments of the present invention will be described. In the following description of preferred embodiments, elements having functions substantially common to those of elements in the first preferred embodiment are referred to by common reference numerals, and further explanation thereof will be accordingly omitted.

Second Preferred Embodiment

Figure 11:
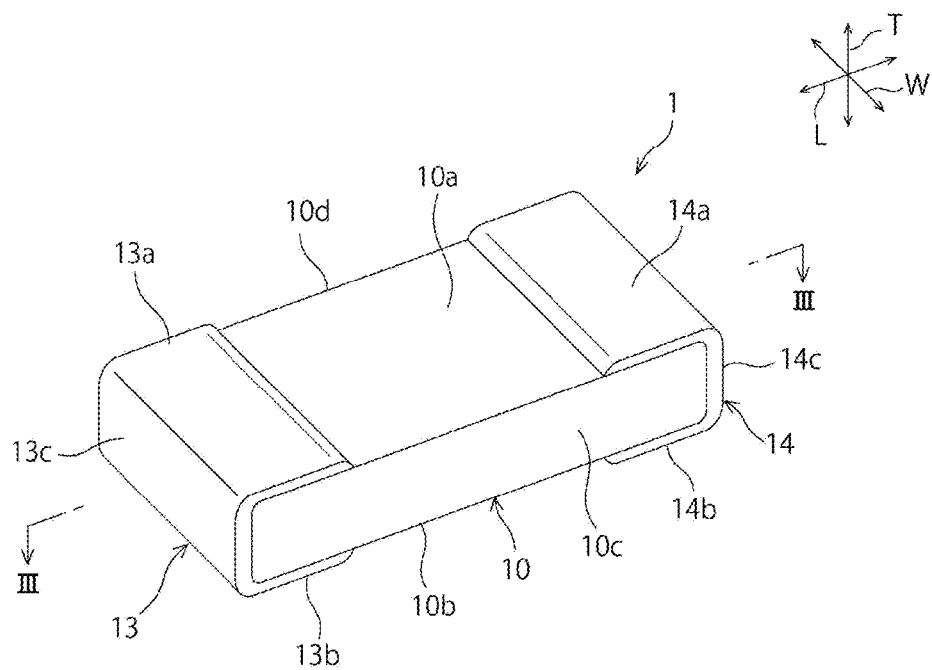
FIG. 11 is a schematic perspective view of a ceramic electronic component according to a second preferred embodiment of the present invention.

FIG. 11 is a schematic perspective view of a ceramic electronic component according to a second preferred embodiment of the present invention.

In the above first preferred embodiment, an example has been described in which the first and second electrode terminals 13 and 14 and the glass coating layers 15 are preferably located on the first and second side surfaces 10c and 10d. However, as shown in FIG. 11, the first and second electrode terminals 13 and the glass coating layers 15 may not be substantially provided on the first and second side surfaces 10c and 10d.

Figure 12:
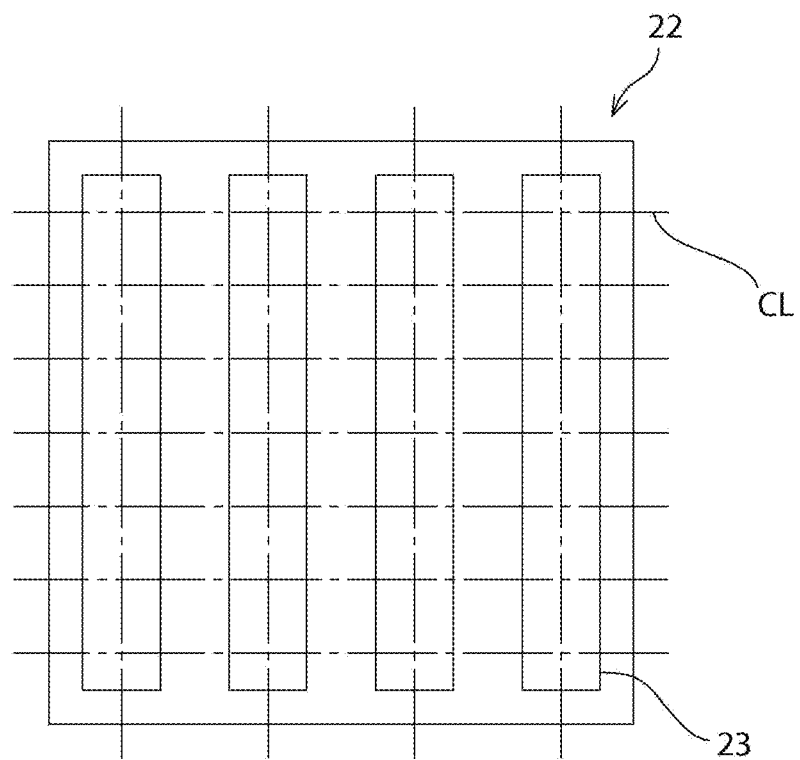
FIG. 12 is a schematic view for illustrating a method for producing the ceramic electronic component according to the second preferred embodiment of the present invention.

The ceramic electronic component according to the second preferred embodiment can be produced, for example, in the following manner. A mother laminate 22 (see FIG. 12) is obtained in the same manner as in the method for producing the ceramic electronic component 1 according to the first preferred embodiment. In this preferred embodiment, next, as shown in FIG. 12, an electrically conductive pattern 23 having a configuration corresponding to the first and second portions 13a, 13b, 14a, and 14b of the first and second electrode terminals 13 and 14 is formed on the mother laminate 22 by an appropriate printing process, such as screen printing. Next, the mother laminate 22 is cut along imaginary cutting lines CL to produce a plurality of green ceramic laminates from the mother laminate 22.

Next, each of the green ceramic laminates is fired. Next, a glass paste is applied on both end surfaces of the fired ceramic laminate. Next, the glass paste is thermally treated to form glass coating layers 15 having shapes corresponding to the third portions 13c and 14c of the first and second electrode terminals 13 and 14. Next, the glass coating layers 15 are plated to form the first and second electrode terminals 13 and 14. Thus, the ceramic electronic component according to the second preferred embodiment can be produced.

The glass paste applied to the third portions 13c and 14c of the first and second electrode terminals 13 and 14 is different in the type of metal or the type of inorganic filler from the electrically conductive pattern 23 formed on the first and second portions 13a, 13b, 14a, and 14b of the first and second electrode terminals 13 and 14. For example, the electrically conductive pattern 23 preferably includes Ni and a common ceramic material to the ceramic material contained in the ceramic body 10.

Third Preferred Embodiment

Figure 13:
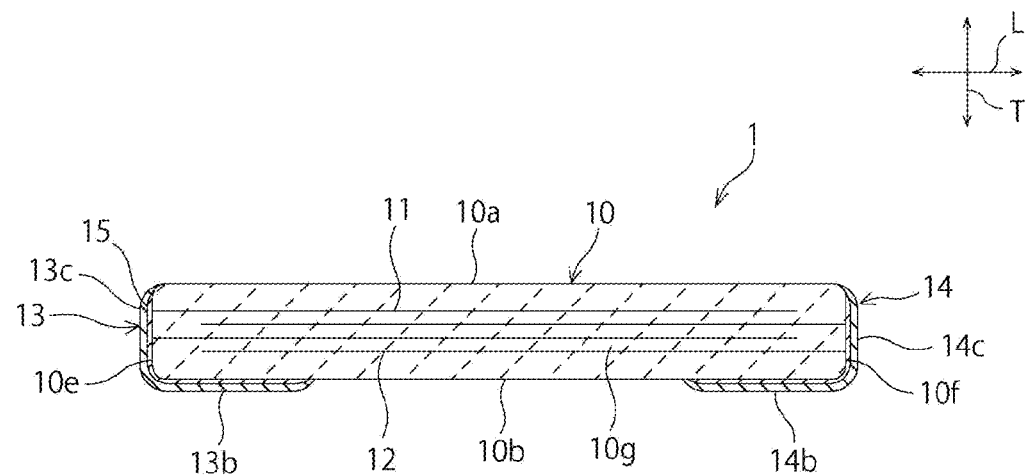
FIG. 13 is a schematic cross-sectional view of a ceramic electronic component according to a third preferred embodiment of the present invention.

FIG. 13 is a schematic cross-sectional view of a ceramic electronic component according to a third preferred embodiment of the present invention.

In the above first preferred embodiment, an example has been described in which the first and second electrode terminals 13 and 14 and the glass coating layers 15 are preferably located on both the first and second principal surfaces 10a and 10b. However, the present invention is not limited to this configuration. The first and second electrode terminals 13 and the glass coating layers 15 only have to be located somewhere on the surface of the ceramic body 10.

For example, as shown in FIG. 13, the first and second electrode terminals 13 and 14 and the glass coating layers 15 may be provided on the second principal surface 10b but not provided on the first principal surface 10a.

Fourth Preferred Embodiment

Figure 14:
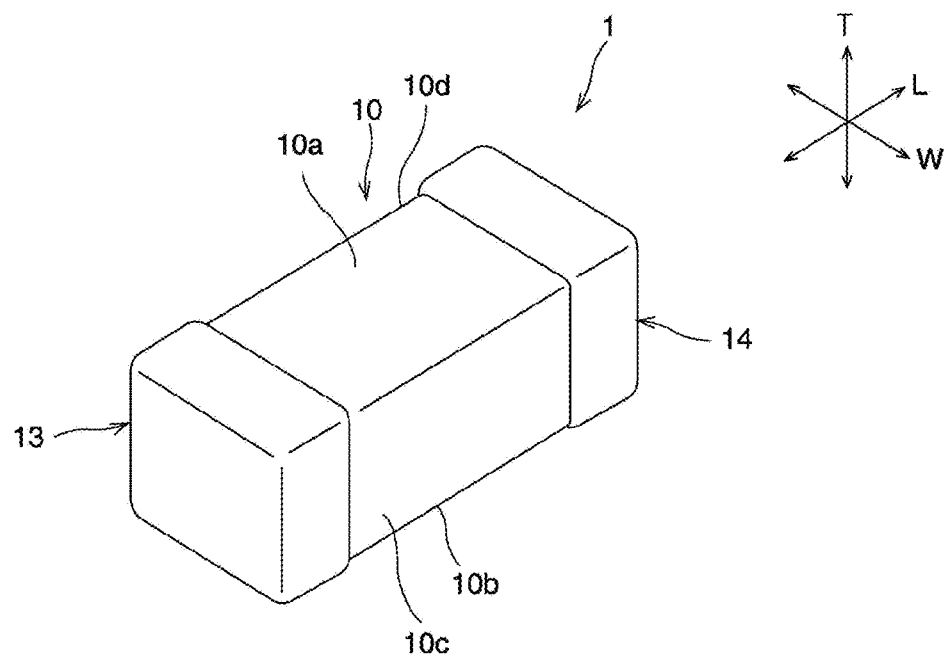
FIG. 14 is a schematic perspective view of a ceramic electronic component according to a fourth preferred embodiment of the present invention.

FIG. 14 is a schematic perspective view of a ceramic electronic component according to a fourth preferred embodiment of the present invention.

In the above first preferred embodiment, an example has been described in which the inequality $D_T<D_W<D_L$ preferably holds where the thickness of the ceramic body 10 is represented by $D_T$, the length thereof is represented by $D_L$, and the width thereof is represented by D. However, as shown in FIG. 14, the ceramic body 30 may satisfy $D_W \leq D_T < D_L$, for example.

As described so far, in various preferred embodiments of the present invention, the portions of the ceramic body from which the internal electrodes are exposed are covered by the glass coating layers. Therefore, a ceramic electronic component having superior moisture resistance can be provided.

Hence, with the structure in which the glass coating layers cover the portions of the ceramic body from which the internal electrodes are exposed, preferred embodiments of the present invention can be widely applied to various laminated ceramic electronic components.

For example, if the ceramic electronic component is a piezo-ceramic element, the ceramic body can be made of a piezo-ceramic material. Specific non-limiting examples of the piezo-ceramic material include lead zirconate titanate (PZT) based ceramic materials.

Alternatively, if the ceramic electronic component is a thermistor, the ceramic body can be made of a semiconductor ceramic material. Specific non-limiting examples of the semiconductor ceramic material include spinel ceramic materials.

Still alternatively, if the ceramic electronic component is an inductor, the ceramic body can be made of a magnetic ceramic material. Specific non-limiting examples of the magnetic ceramic material include ferrite ceramic materials.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A ceramic electronic component comprising:
a ceramic body including a plurality of internal electrodes including ends that are exposed on a surface of the ceramic body;
a glass coating layer covering a portion of the ceramic body on which the plurality of internal electrodes are exposed; and
an electrode terminal provided directly on the glass coating layer and including a plating film; wherein
the glass coating layer is made of a glass medium in which metal powder particles are dispersed;
the glass coating layer is a composite film in which the glass medium and the metal powder particles are integrally bonded;
the glass coating layer has a thickness of about 1 μm to about 10 μm;
the metal powder particles define conduction paths electrically connecting the plurality of internal electrodes with the electrode terminal;
all of the metal powder particles are not sintered together and the glass medium is continuously arranged to fill spaces between the metal powder particles.

2. The ceramic electronic component according to claim 1, wherein a content of glass in the glass coating layer is about 30.2% to about 47.1% by volume.

3. The ceramic electronic component according to claim 1, wherein the metal powder particles have an elongated shape as viewed in cross section along a direction of thickness of the glass coating layer.

4. The ceramic electronic component according to claim 3, wherein the metal powder particles are in rod form or flake form.

5. The ceramic electronic component according to claim 3, wherein the metal powder particles have an aspect ratio of about 3.6 or more.

6. The ceramic electronic component according to claim 1, wherein at least one of the conduction paths is arranged so that a plurality of the metal powder particles are contiguous with one another across the thickness of the glass coating layer.

7. The ceramic electronic component according to claim 1, wherein the metal powder particles contain a major component different from a major component in the internal electrodes.

8. The ceramic electronic component according to claim 1, wherein the metal powder particles include a core made of Cu.

9. The ceramic electronic component according to claim 1, wherein at least one of the conduction paths is non-linear as viewed in cross section along the direction of the thickness of the glass coating layer.

10. The ceramic electronic component according to claim 1, wherein at least one of the conduction paths includes a plurality of relatively narrow portions and a plurality of relatively thick portions.

11. The ceramic electronic component according to claim 1, wherein a portion of the plating film in contact with the glass coating layer includes a Cu plating film or a Ni plating film.

* * * * *